Sept. 26, 1944.    F. A. SCHICK    2,358,830

TRACK ROLLER SEAL

Filed March 25, 1943

Inventor
F. A. Schick
by Miles Kenninger
Attorney

Patented Sept. 26, 1944

2,358,830

UNITED STATES PATENT OFFICE 2,358,830

TRACK ROLLER SEAL

Frederick A. Schick, Springfield, Ill., assignor to Allis-Chalmers Manufacturing Company, Milwaukee, Wis., a corporation of Delaware Application March 25, 1943, Serial No. 480,491

3 Claims. (Cl. 286—11)

This invention relates to improvements in seals for the joint between rotating and stationary or between relatively rotating parts and particularly to seals preventing access of foreign materials to bearings and leakage of lubricant therefrom.

When relatively rotating parts are mounted in a location in which they are subject to dust or mud as is the case for the track driving and guiding wheels and rollers comprising parts of the track structure of a vehicle of the endless track laying type, the bearings for the rotating parts must be protected against the entry of abrasive material and the leakage of lubricant therefrom. Bearings of the precision type such as wheel or roller bearings particularly require the best protection possible to minimize wear which would readily increase the clearances between bearing parts and destroy the effectiveness of such bearings. The sealing effect is here obtained by close contact between two highly finished surfaces of plates so mounted as to prevent any distortion of the contact surfaces. Close contact of the surfaces in such a seal has been maintained solely by the pressure exerted by a relatively heavy tube of resilient material under compression. It is however difficult to produce such tube with a sufficient degree of uniformity of dimensions and material to secure a predetermined amount and constancy of pressure and uniform distribution of pressure on the contact surfaces. Such desired pressure and pressure distribution can be obtained by using metallic springs acting between one of the sealing members and one of the parts to be sealed and the resilient tube can be relegated to the position of furnishing only a relatively thin foreign material and lubricant impervious covering for the pressure producing springs and their mounting.

It has been found that the desired uniformity of pressure distribution is more advantageously provided by a plurality of small springs under compression than by one large spring. It is desirable however in this latter case to provide means holding such springs in position and to furnish a frame for the enclosing impervious tube. Because the enclosing tube is relatively thin it is also particularly advantageous to provide tube and spring supporting means of such character as to minimize the transmission of torsional stress to the tube or to the springs. If the tube and spring supporting means are made from angle shaped rings with interengaging lugs, such lugs will take up any torque produced by the friction between the relatively rotating parts. Due to the fact that the springs are under compression it is also desirable to additionally provide the interengaging lugs with interengaging ears to prevent expansion of the springs beyond a predetermined limit which would place the enclosing tube under axial stress.

It is therefore an object of the present invention to provide an improved seal for relatively rotating parts, the seal being of the type employing contacting parts under a predetermined pressure, with pressure producing means enclosed in an impervious flexible covering to form a pressure producing unit applicable to press together both of the contacting parts.

Another object of the invention is to provide a contact plate type of seal for relatively rotating parts, with a unit producing uniform pressure on such plates while taking up torque and limiting axial movement of the parts of the unit in both directions.

Another object of the invention is to provide a frame for a uint producing pressure on contact plates sealing relatively rotating parts, in which the frame has interengaging lugs taking up torsional stress and the lugs have ears extending from adjacent lug edges and interengaging to limit axial movement of the frame parts thereby minimizing transmission of undesirable stresses to the covering enclosing the frame.

Another object of the invention is to provide a frame for a pressure producing unit which frame has permanently interlocked rings having interengaging lugs lying in a cylindrical annular space of radial thickness equal to the thickness of the lug material, thereby providing a compact unit occupying the least axial space.

Objects and advantages other than those above set forth will be apparent from the following description when read in connection with the accompanying drawing in which.

Figure 1:
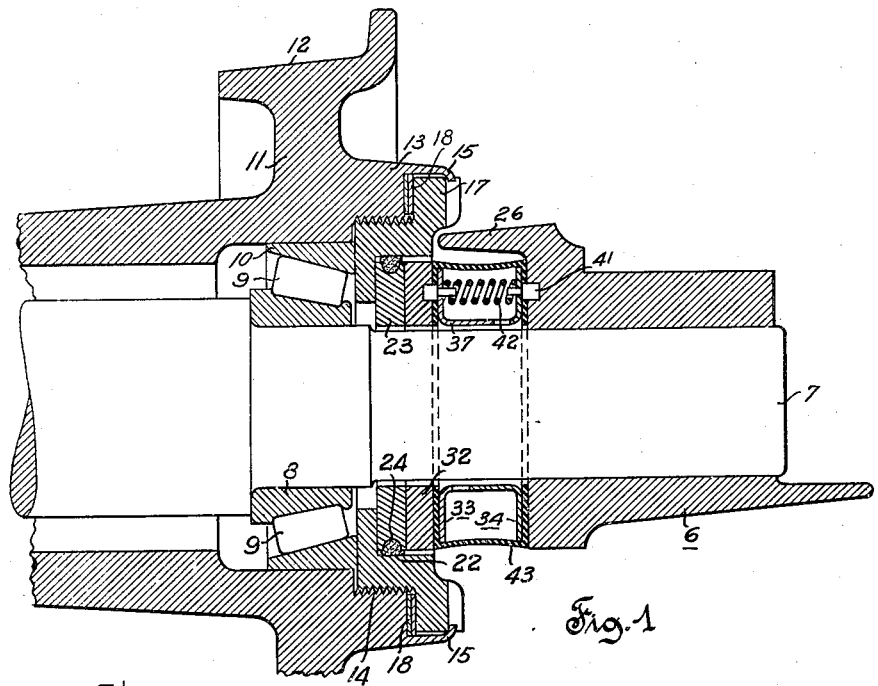
Fig. 1 is a cross-sectional view taken on a vertical plane showing a seal of the contact plate type equipped with a pressure producing unit of the present invention and applied to protecting the bearing between a stationary axle and a rotating track roller for the track supporting structure of a track laying vehicle.
Figure 2:
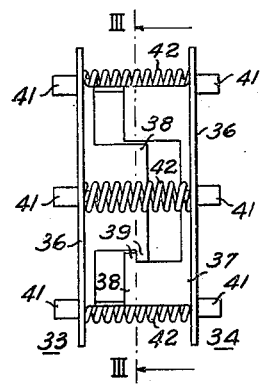
Fig. 2 is a side elevational view showing the angle rings with interengaging lugs and ears forming the frame positioning the pressure producing springs and supporting the enclosing casing of a unit for producing pressure on a seal of the contacting plate type.

Referring to the drawing, a bracket 6 is attached to a track frame (not shown) on which other parts of the machine are mounted and supported. The bracket 6 has mounted therein an axle 7 on which is mounted a known type of precision bearing shown as comprising an inner raceway 8, rollers 9 and an outer raceway 10. On the outer raceway 10 is mounted a track roller 11 having a track supporting portion 12 to run on a track rail (not shown) forming a part of the track structure, and having a hub portion 13 which is bored to provide a screw threaded portion 14 immediately adjacent the bearing and is bored at its outer end on a larger diameter to leave only a relatively thin hub wall 15 at such outer end. The track roller hub bores receive a retainer 17 having a screw threaded portion engaging the screw threaded portion 14 of the track roller hub and with a flange extending into the outer track roller hub bore and seating on shims 18. The retainer provides means acting on the bearing raceway 10 for the purpose of adjusting the clearances in the bearing structure. After the bearing is adjusted to the desired operating clearances, portions of the track roller hub wheel 15 are peened or rolled over the edge of the retainer into slots to fix its position.

It will be understood that the bracket 6 and the axle 7 are stationary and that the track roller 11 rotates thereon. It is therefore necessary to provide a seal between such stationary and rotating parts to prevent the access of dust, dirt and other abrasive material to the bearing and to minimize the leakage of lubricant therefrom. A resilient ring 22 is compressed in the interior bore of the retainer and is seated in a groove 24 formed in the outer edge of an annular plate 23. When the ring 22 is free it is toroidal in cross section and when it is located in its operative position the ring is compressed and deformed as shown. The outer face of the plate 23 is highly finished in as nearly as possible a perfect plane and the ring 22 frictionally retains the plate in floating position within the retainer 17, that is, without exerting any force on such plate as might distort the plane finished surface thereof.

Figure 3:
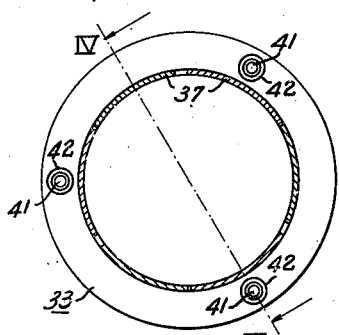
Fig. 3 is a sectional view taken on the plane of the line III—III of Fig. 2 to show the location of the springs and the interengaging lugs upon the angle rings.
Figure 4:
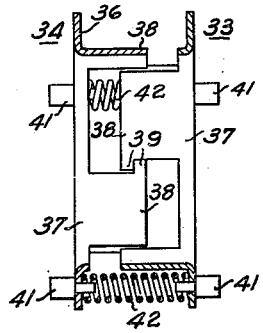
Fig. 4 is a sectional view taken on the plane of the line IV—IV of Fig. 3 and showing particularly the detail of the pins serving to position the springs and the enclosing casing on the pressure producing unit and also serving to position the unit in the one part to be sealed and to position one of the contact plates on such unit.
Figure 5:
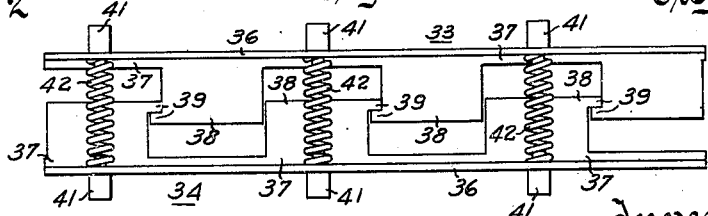
Fig. 5 is a developed side elevational view of the pressure producing frame showing particularly the relation of the interengaging lugs with their interengaging ears and forming a part of the frame rings.

The bracket 6 has an extension 26 from the upper portion of the inner end of the bracket to aid in defining a space between the track roller hub and the end of the bracket and guarding such space from large masses of material which might drop thereinto. The space receives a ring 32 forming the other contacting sealing member and having one face thereof also finished in as nearly as possible a perfect plane to contact with the finished face of the seal plate 23 under the action of a pressure producing unit urging the sealing ring 32 toward the seal plate 23. The pressure producing unit comprises rings 33, 34, made with portions 36 extending radially of the axle 7 and portions 37 extending axially of the axle. The ring portions 37 are cut to form interengaging lugs 38 which are in line with each other both circumferentially and axially. The lugs 38 therefore cooperate as stops to prevent relative rotary movement of the rings 33, 34. The lugs 38 are each provided with an ear 39 which ears are in line with each other axially to act jointly, through abutting edges thereon, as stops to limit the axial movement of rings in the direction separating the rings. The ears 39 so formed constitute an undercutting of the arcuate lugs and this undercutting is the basis of the interlocking of the rings. The lugs and ears lie in a cylindrical annular space of radial thickness equal to the thickness of the lug material as shown in Fig. 3, thus conserving radial space to a minimum.

Each of the rings 33, 34 is provided with a plurality of pins 41 extending through the ring portions 36 on each side thereof. The adjacent ends of each pair of pins 41 serve as anchoring and positioning points for the ends of relatively light helical springs 42 which are under compression and tend to keep rings 33, 34, spaced in the axial direction. The size of the springs 42 is determined by the pressure which it is desired to exert on the seal plate 23 and the seal ring 32 and the springs are equally spaced about the circumference of the ring to secure as uniform as possible distribution of pressure over the entire contact area of the seal plate and ring. A resilient tube 43 serves as an impervious enclosure for the spring supporting frame and is free from torsional or tensional stresses. These are taken up by the action of the interengaging lugs 38 with their interengaging ears 39. The tube 43 is formed with flanged ends extending over end rings 33, 34, and is held in position on such rings by pins 41 extending through holes in the tube flanges. The tube 43 hence encloses the spring frame or rings 33, 34, on its outer side and at the ends thereof.

It will be seen that the present construction provides a completely self-contained pressure producing unit for seals between relatively rotating parts in which the unit is readily assembled and stored without change in its characteristics. Pressure is uniformly applied to all parts of the contacting surface of the seals without variations due to the length of service of the pressure producing unit. The interengaging lugs of the spring and tube supporting frame of the pressure producing unit, take up all torsional stresses on the unit and the lug ears prevent the application of stress in an axial direction on the enclosing tube thus allowing the tube to be made of any one of a large number of materials requiring only flexibility and but little strength.

Although but one embodiment of the present invention has been illustrated and described it will be apparent to those skilled in the art that various changes and modifications may be made therein without departing from the scope or the spirit of the following claims.

It is claimed and desired to secure by Letters Patent:

1. In a seal for the joint between relatively moving parts, a plate floatingly mounted in the one said part, a ring resiliently held in contact with said plate, said plate and said ring having finished surfaces forming the contacting portions of the seal, and a pressure producing unit mounted on the other said part to position said sealing ring and comprising rings having interengaging lugs to prevent relative rotary movement and the lugs having ears permanently inter-locked to limit axial separation of the rings.

2. In a seal for the joint between relatively moving parts, a plate floatingly mounted in the one said part, a ring resiliently held in contact with said plate, said plate and said ring having finished surfaces forming the contacting portions of the seal, a pressure producing unit mounted on the other said part to position said sealing ring and comprising permanently interlocked rings having interengaging lugs to prevent relative rotary movement therebetween, springs tending to separate the rings axially, the ring lugs having interengaging ears to limit axial separation of the rings, and the lugs and ears lying in a cylindrical annular space of radial thickness equal to the thickness of the material thereof, and a tube of resilient material substantially enclosing the rings and the springs.

3. For use in sealing a bearing between relatively rotatable parts and as an article of manufacture for location axially between said parts for urging together two plane surfaced sealing rings, a pressure producing dust sealing unit comprising two permanently interlocked rings having undercut cylindrically arcuate lugs lying in a cylindrical annular space of radial thickness equal to the thickness of the lug material and said lugs having abutting edges for preventing relative rotation and for permitting limited axial motion of said interlocked rings, spring means tending to axially separate said rings and a flexible tube for enclosing said unit.

FREDERICK A. SCHICK.